(12) United States Patent
Kazem et al.

(10) Patent No.: US 11,556,181 B2
(45) Date of Patent: Jan. 17, 2023

(54) AUTOGENERATING STORIES AND EXPLORATIONS FROM BUSINESS ANALYTICS APPLICATIONS

(71) Applicant: INTERNATIONAL BUSINESS MACHINES CORPORATION, Armonk, NY (US)

(72) Inventors: Firas Kazem, Kanata (CA); Peter Djeneralovic, Stoney Creek (CA)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 16/823,888

(22) Filed: Mar. 19, 2020

(65) Prior Publication Data
US 2021/0294422 A1 Sep. 23, 2021

(51) Int. Cl.
*G06F 3/0482* (2013.01)
*G06F 3/01* (2006.01)
*G06F 16/901* (2019.01)
*G06F 16/9035* (2019.01)
*G06F 16/9038* (2019.01)
*G06F 16/9032* (2019.01)

(52) U.S. Cl.
CPC ............ *G06F 3/017* (2013.01); *G06F 3/013* (2013.01); *G06F 3/0482* (2013.01); *G06F 16/9027* (2019.01); *G06F 16/9035* (2019.01); *G06F 16/9038* (2019.01); *G06F 16/90328* (2019.01)

(58) Field of Classification Search
None
See application file for complete search history.

(56) References Cited

U.S. PATENT DOCUMENTS

| 8,434,867 | B2 | 5/2013 | Helfman et al. |
| 9,230,221 | B2 | 1/2016 | Gobert et al. |
| 9,778,740 | B2 | 10/2017 | Rantakokko et al. |

(Continued)

FOREIGN PATENT DOCUMENTS

WO 2014061017 A1 4/2014

OTHER PUBLICATIONS

Templin, "Visual Engagement Metrics: Your Optimization Secret Weapon", https://conversionxl.com/blog/visual-engagement-metrics/, Jul. 7, 2016, 20 pages.

(Continued)

*Primary Examiner* — Tuyetlien T Tran
(74) *Attorney, Agent, or Firm* — Eric Chesley; Andrew D. Wright; Calderon Safran & Cole, P.C.

(57) ABSTRACT

A computer-implemented method includes tracking, by a computer device, movements of a user viewing a dashboard containing visualizations. The method also includes generating, by the computer device, heatmaps having hotspots onto the dashboards in view of the tracked movements of the user. Additionally, the method includes generating, by the computer device, bounding boxes around the hotspots. Further, the method includes mapping, by the computer device, the bounding boxes to the visualizations. The method also includes creating, by the computing device, a tree diagram listing the hotspots which correspond to the bounding boxes. Additionally, the method includes generating automatically, by the computing device, a story or exploration from the tree diagram.

20 Claims, 11 Drawing Sheets

(56) References Cited

U.S. PATENT DOCUMENTS

| | | |
|---|---|---|
| 9,798,382 B2 | 10/2017 | Johansen et al. |
| 2011/0261049 A1 | 10/2011 | Cardno et al. |
| 2012/0089488 A1* | 4/2012 | Letchford .............. G06Q 30/02 |
| | | 705/27.2 |
| 2014/0184550 A1* | 7/2014 | Hennessey .............. G06F 3/013 |
| | | 345/173 |
| 2015/0170382 A1* | 6/2015 | Bhatia ................... G06F 16/252 |
| | | 345/440 |
| 2015/0234457 A1 | 8/2015 | Kempinski |
| 2016/0171734 A1* | 6/2016 | Colby ................... G06T 11/206 |
| | | 345/634 |
| 2017/0286373 A1* | 10/2017 | Bauchot .............. G06F 16/9024 |
| 2018/0173372 A1* | 6/2018 | Greenspan ............. G06N 20/00 |
| 2019/0251707 A1* | 8/2019 | Gupta ..................... G06T 9/002 |

OTHER PUBLICATIONS

Mell et al., "The NIST Definition of Cloud Computing", NIST, Special Publication 800-145, Sep. 2011, 7 pages.

Unknown, "Visualization recommendation system using a hybrid machine learning approach", IP.com Prior Art Database Technical Disclosure, IP.com No. IPCOM000260192D, Oct. 30, 2019, 4 pages.

\* cited by examiner

900

AUTOGENERATING STORIES AND EXPLORATIONS FROM BUSINESS ANALYTICS APPLICATIONS

BACKGROUND

Aspects of the present disclosure relate generally to analytics and, more particularly, to autogenerating stories and explorations from business analytics applications.

Business analytics applications are applications for visualizing, analyzing and sharing data. These business analytics applications are often consumed in a read-only mode, or on devices which do not capture user interactions.

SUMMARY

In a first aspect of the disclosure, there is a computer-implemented method that includes tracking, by a computer device, movements of a user viewing a dashboard containing visualizations. The method also includes generating, by the computer device, heatmaps having hotspots onto the dashboards in view of the tracked movements of the user. Additionally, the method includes generating, by the computer device, bounding boxes around the hotspots. Further, the method includes mapping, by the computer device, the bounding boxes to the visualizations. The method also includes creating, by the computing device, a tree diagram listing the hotspots which correspond to the bounding boxes. Additionally, the method also includes generating automatically, by the computing device, a story or an exploration from the tree diagram.

In another aspect of the disclosure, there is a computer program product including one or more computer readable storage media having program instructions collectively stored on the one or more computer readable storage media. The program instructions are executable to: track movements of a user viewing a dashboard of visualizations; generate heatmaps onto visualizations in the dashboards from the tracked movements of the user; analyze the heatmaps to detect hotspots in the heatmaps; create boundaries around the hotspots; map the boundaries to the visualizations; determine which select visualizations of the visualizations were consumed by the user by comparing coordinates of the mapped boundaries to coordinates of the select visualizations; generate a tree diagram listing the select visualizations; and generate automatically a story or exploration from the tree diagram.

In another aspect of the disclosure, there is system including a processor, a computer readable memory, one or more computer readable storage media, and program instructions collectively stored on the one or more computer readable storage media. The program instructions are executable to: track movements of a user viewing a plurality of dashboards; generate heatmaps onto visualizations in the dashboards from the tracked movements of the user; analyze the heatmaps to detect hotspots in the heatmaps; create boundaries around the hotspots; map the boundaries to the visualizations; determine which select visualizations of the visualizations were consumed by the user by comparing coordinates of the mapped boundaries to coordinates of the select visualizations; generate a tree diagram listing the hotspots which correspond to the select visualizations; reduce the select visualizations to a list of concepts based on columns of data mapped to the visualizations; generate a concept tree diagram listing the concepts; and generate automatically a story or an exploration from the concept tree diagram.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION

Figure 1:
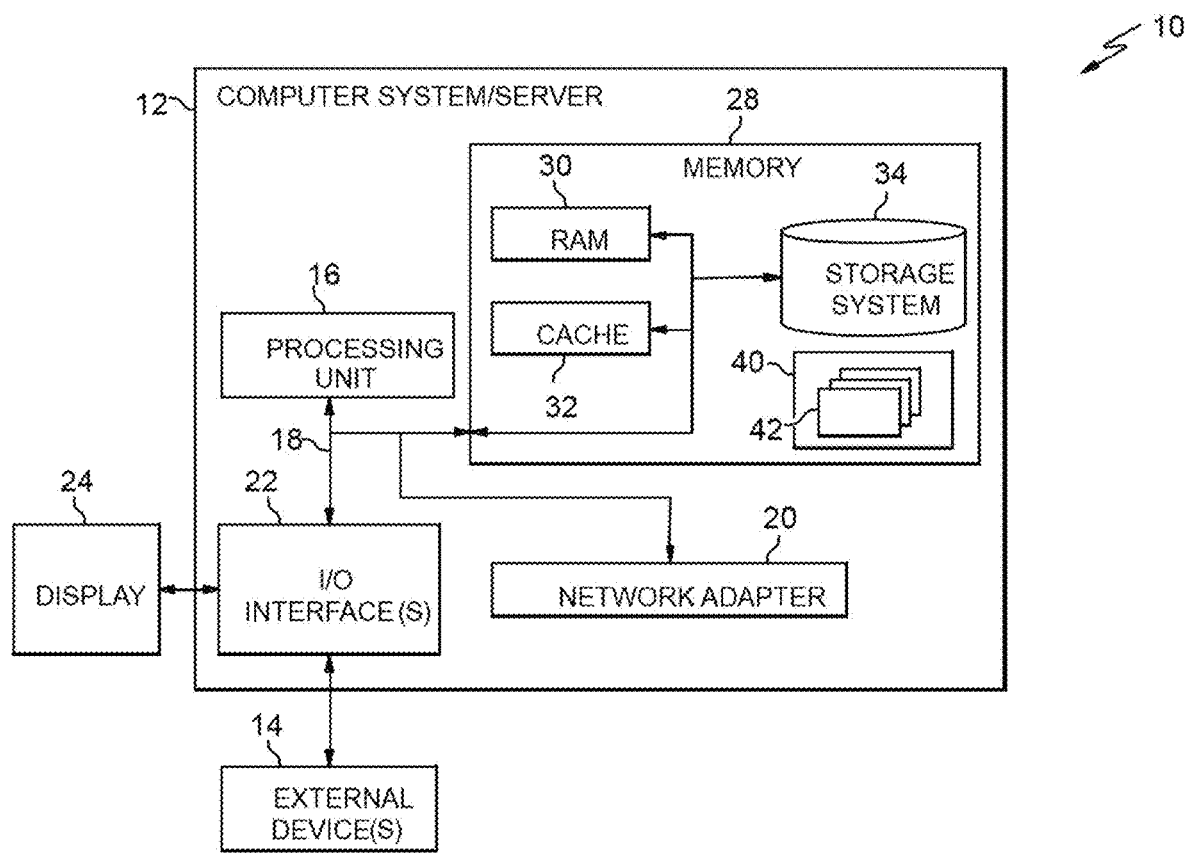
FIG. 1 depicts a cloud computing node according to an embodiment of the present invention.

Aspects of the present disclosure relate generally to analytics and, more particularly, to autogenerating stories and explorations from business analytics applications. According to aspects of the disclosure, personalized auto-generated stories and explorations are created based on user interests from interacting with business analytics applications. In embodiments, the system captures which visualizations in a dashboard of a business analytics application a user is most interested in while they interact with, i.e., consume, the business analytics application. In embodiments, each visualization has as a root one or more columns of datasets, with concepts describing the columns attached to the visualization. From these concepts, the systems and processes described herein associate concepts with the visualizations and then track user interest in these visualizations and concepts. The system captures these user interests by utilizing eye tracking technologies, augmented by explicit user actions, e.g., mouse events and keyboard events, amongst other features. Accordingly, the system allows for capturing the visualizations in which the user is most interested from a business analytics application.

In embodiments, after determining the visualizations, the system analyzes how the visualizations are related to each other and an order (ranking) in which the user interacted with the visualizations when reviewing the business analytics application. The system determines how the visualizations are related and their order of consumption, i.e., interaction, by utilizing the eye tracking and actions of the user to generate heatmaps for visualizations the user is interacting with over a time-bound session. In this way, the heatmaps allow for a visual indication of the user's interests while interacting with the business analytics application. In embodiments, the system generates multiple heatmaps for the same business analytics application or for different business analytics applications interacted with by the user.

In embodiments, the system analyzes the heatmaps by utilizing a computer vision model to identify hotspots on the heatmap to create a timeline (sequence) of visualizations being interacted with, i.e., consumed, and their order of consumption (interaction). In one example, the system generates a bounding box around each respective hotspot identified and maps each bounding box to a respective visualization in the business analytics application. The system ranks the visualizations in order of a number of views by the user to identify a set of popular visualizations. In embodiments, the system translates this timeline into ontological concepts represented by columns of datasets mapped to specific slots of visualizations.

In embodiments, the system creates autogenerated personalized stories, e.g., an ordered set of slides or other formats of information which interest the user, based on the order that the user interacted with various visualizations when reviewing the business analytics application. In further embodiments, the system also creates autogenerated personalized explorations, e.g., a free-form of visualizations to explore existing data or new data from a business analytics application, from the interacted with business analytics application and/or the autogenerated story.

In embodiments, the autogenerated personalized explorations and stories are based on the columns of datasets mapped to the visualizations the user interacted with when reviewing the business analytics application. In this manner, implementations of the disclosure capture and analyze information to infer a user's interests and automatically create stories and explorations based on these user interests.

Conventional business analytics applications generally do not capture user interactions and/or interests. Accordingly, it is difficult to infer the interests of a user when they interact with a business analytics application. In this way, a user manually creates a business analytics application to visualize data they are interested in because their interests have not been captured. Embodiments of the present disclosure address these problems with conventional business analytics applications by capturing the interests of the user and using these interests to autogenerate stories and/or explorations which interest the user.

In embodiments, the present disclosure includes a computer-implemented process for generating business analytics applications. The process begins in response to a user interacting, including interactions of at least one of viewing, mouse movement, speech, and gestures, with an output associated with a business analytics application over a predetermined period of time. The process continues with an operation of mapping areas of the output associated with the interactions to a corresponding list of coordinates by a computer. Further, the process includes generating, by the computer, a heatmap representing the areas of the output of probable interest to the user within the predetermined period of time. Additionally, the process includes analyzing the heatmap by the computer using a predetermined vision model to identify hotspots on the heatmap, and generating, by the computer, a bounding box around each respective hotspot identified. In embodiments, the process includes mapping, by the computer, each bounding box to a respective visualization in the business analytics application, and ranking the visualizations, by the computer, in order of a number of views by the user to identify a set of popular visualizations. Additionally, the process includes in response to identifying, by the computer, two or more visualizations viewed in tandem over a configurable time interval, an operation of inferring, by the computer, the two or more visualizations are related from a perspective of the user. In addition, the process includes determining, by the computer, an order in which the user views the visualizations. In embodiments, the process includes reducing, by the computer, each visualization to a list of ontological concepts, wherein each visualization has columns of a respective dataset mapped to slots of the visualization, and wherein the columns are mapped to the list of ontological concepts. Additionally, the process includes translating, by the computer, information associated with related visualizations, the set of popular visualizations, and the order in which the visualizations are viewed, into an exploration or story of columns of similar datasets.

Implementations of the disclosure allow for the generation of a new source or type of information, and new techniques for analyzing the new source or type of information. In one example, embodiments improve the functioning of a computer by providing methods and systems for capturing and analyzing data with respect to a user's eye movements and user actions, e.g., mouse events and keyboard events, to determine user interests with respect to a business analytics application. The systems and processes use the user interests for generating objects of interest to the user. Additionally, embodiments improve the functioning of a computer by providing methods and systems that automatically generate an exploration, which is a new technique for viewing information from a business analytics application. Specifically, an exploration is a visual representation of data from the business analytics application which can be explored and investigated to determine how the datasets from the business analytics application are related. Allowing data from the business analytics application to be explored in view of relationships of the datasets is a new technique for analyzing a new source of information. Accordingly, through the use of rules that improve computer-related technology, implementations of the disclosure allow computer performance of functions not previously performable by a computer. Additionally, implementations of the disclosure use techniques that are, by definition, rooted in computer technology (e.g., business analytics applications, dashboards, stories and explorations).

In addition, the operations for autogenerating stories and exploration are unconventional, and the combination of the operations is also unconventional. In one example, the systems and processes described herein capture user interests when a user interacts with a business analytics application. In embodiments, a tracking device captures user's eye movements and user actions when a user views a dashboard of the business analytics application which contains various visualizations representing various datasets. The captured movements are utilized for generating heatmaps on the visualizations which interest the user. The systems and processes use the heatmaps to determine which visualizations and datasets interest the user by generating a bounding box around each respective hotspot in the heatmaps and mapping each bounding box to a respective visualization. These operations of tracking movements and generating heatmaps and mapping bounding boxes to determine user interests are unconventional. Specifically, new information is used in subsequent operations in an unconventional manner for generating new data techniques.

It should be understood that, to the extent implementations of the disclosure collect, store, or employ personal information provided by, or obtained from, individuals (for example, visualizations captured from a user interacting a business analytics application), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
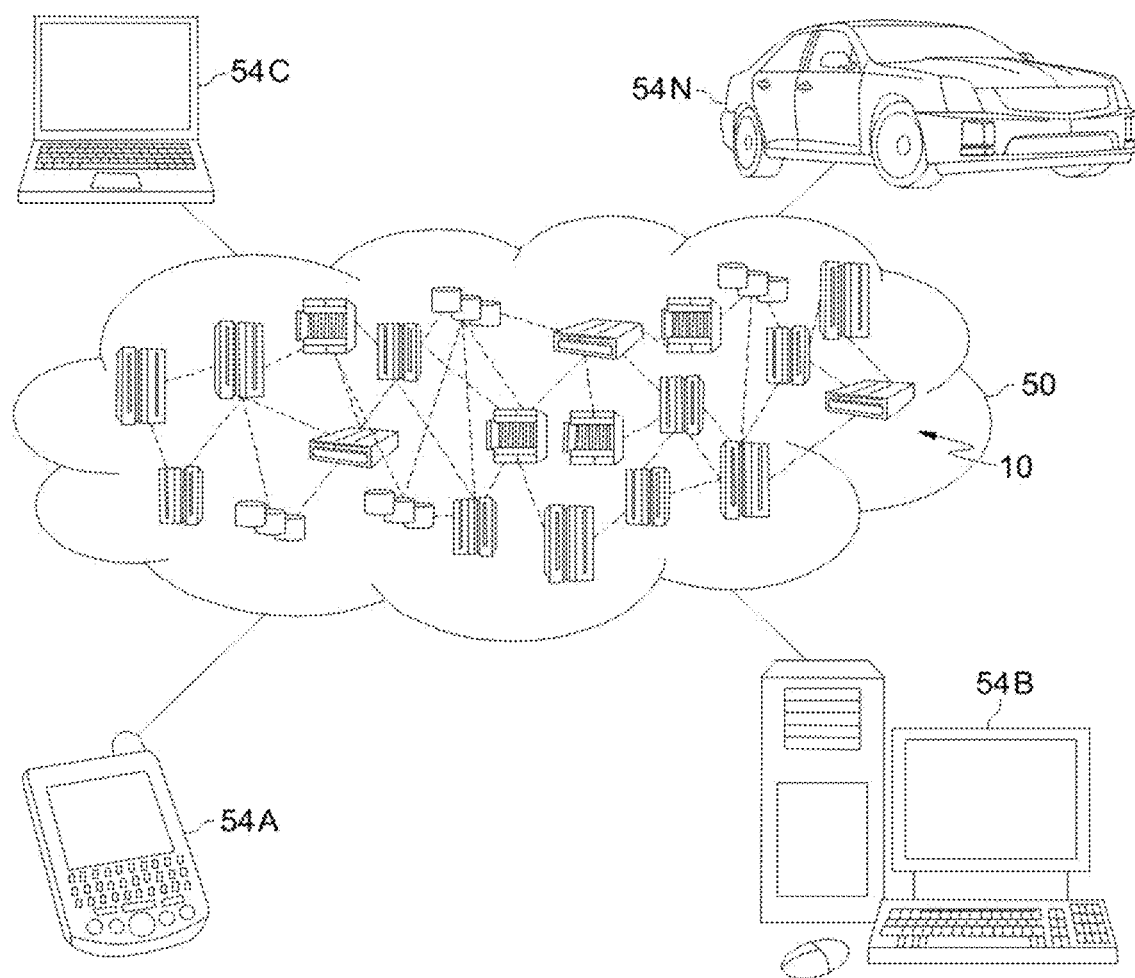
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
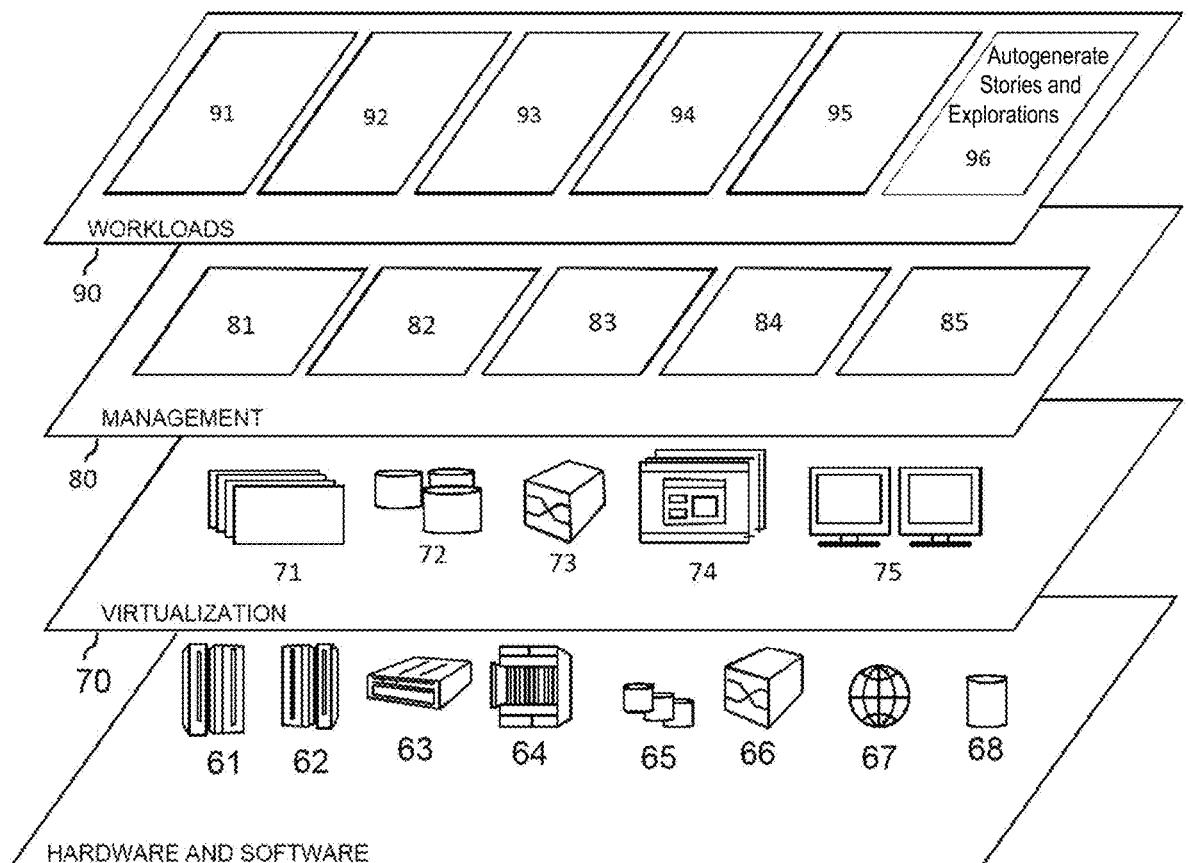
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and autogenerate stories and explorations 96.

Implementations of the disclosure may include a computer system/server 12 of FIG. 1 in which one or more of the program modules 42 are configured to perform (or cause the computer system/server 12 to perform) one or more functions to autogenerate stories and explorations 96 of FIG. 3. In one example, the one or more of the program modules 42 may be configured to: track eye movements and actions of a user as the user interacts with a business analytics application; generate a heatmap over the business analytics application to represent areas of interest to the user within a predetermined period of time; using a computer vision model to identify hotspots on the heatmap; generate a bounding box around each respective hotspot to determine visualizations of interest to the user in the business analytics application; order and rank the visualizations to identify a set of visualizations which interest the user; and automatically generate a story or exploration with the visualizations which interest the user.

In embodiments, the program modules 42 are configured to: reduce each visualization to a list of ontological concepts, with each visualization having columns of a respective dataset mapped to slots of the visualization, and the columns are mapped to a list of ontological concepts; and translate the visualizations into a story or an exploration of columns of similar datasets.

Figure 4:
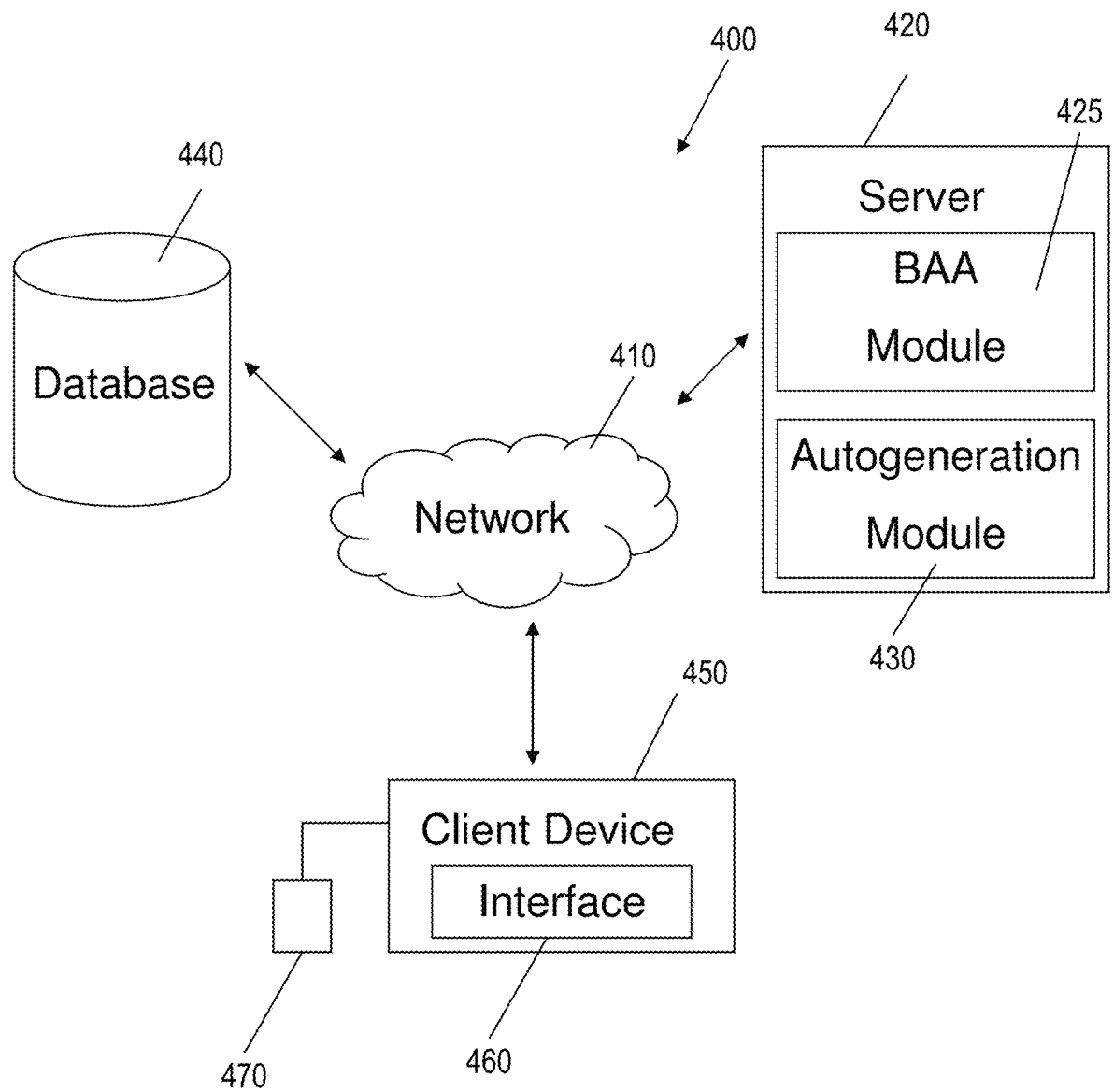
FIG. 4 shows a block diagram of an exemplary environment in accordance with aspects of the disclosure.

FIG. 4 shows a block diagram of an exemplary environment 400 in accordance with aspects of the disclosure. In embodiments, the environment 400 includes network 410, server 420, database 440 and client device 450. The server 420 comprises a business analytics application (BAA) module 425 and an autogeneration module 430, which may comprise one or more program modules such as program modules 42 described with respect to FIG. 1. The server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4. The network 410 is representative of a cloud network as described in FIG. 2. The client device 450 is a computing device, e.g., desktop, smartphone etc., and may include one or more components of the computer system 12 of FIG. 1.

In embodiments, a business analytics application is a software application for visualizing, analyzing and sharing data. The business analytics application is generated through the BAA module 425 and provides visualizations for data to the user through a dashboard, with the client device 450 being configured to display the dashboard to the user through an interface 460. In embodiments, a dashboard is a display that allows a user to monitor events or activities at a glance by providing insights and analysis about the data on one or more pages or screens in the interface 460. In embodiments, the visualizations are regions of the dashboard providing a visual illustration of the data. Specifically, the visualizations contain one or more columns of datasets, with concepts describing the columns of the datasets attached to each visualization. In one example, the visualizations in the dashboard are in in the form of charts, texts or other formats for conveying information/data.

According to aspects of the disclosure, tracking device 470 tracks the eye movements, gestures and actions of the user as the user consumes information displayed by the dashboard on interface 460. In embodiments, the eye tracking and action/gesture tracking technologies implemented by tracking device 470 are open source technologies or other algorithms and allow for the tracking device to determine an area of the dashboard being interacted with by the user. In this way, the tracking device 470 of the systems and processes described herein allows for capturing user actions with respect to visualizations of interest to the user within the area of the dashboard being interacted with by the user. In embodiments, the tracking device 470 is a camera or other recording device.

The autogeneration module 430 determines which visualizations are interacted with and their order of consumption, i.e., interaction, by generating heatmaps onto the visualizations within the dashboard to indicate which visualizations the user is interacting with. In this way, the heatmaps allow for a visual indication of visualizations of interest within the dashboard of the business analytics application. In embodiments, the heatmaps include hotspots which indicate a visualization that is focused on during a viewing session of the business analytics application. In embodiments, the size of the hotspot is related to an amount of interaction time with respect to the visualization. In one example, a hotspot is larger for a visualization which was interacted with for a relatively longer time period than another visualization looked at for a relatively longer time period. In embodiments, the autogeneration module 430 generates multiple heatmaps for the dashboard or for different dashboards interacted with by the user. The heatmaps are stored in the database 440 for analysis by the autogeneration module 430.

The autogeneration module 430 analyzes the heatmaps by feeding the heatmaps into a computer vision model to create a timeline (sequence) of visualizations looked at by the user, and in which order. The autogeneration module 430 determines the timeline by using the computer vision model to detect the hotspots within the heatmap and create bounding boxes around each hotspot detected. In embodiments, generating bounding boxes occurs through edge detection processes around edges of the hotspots.

The autogeneration module 430 determines which bounding boxes correspond to which visualizations by comparing the locations of the bounding boxes to a known specification of dashboard. In embodiments, the specification of the dashboard is stored in the database 440 and accessed by the autogeneration module 430. The specification contains the coordinates for each visualization in the dashboard. Further, each generated bounding box has a set of coordinates determined by the autogeneration module 430. The autogeneration module 430 compares the list of coordinates of the visualizations to the coordinates of the bounding boxes to determine the locations of the visualizations of interest. In this way, the autogeneration module 430 maps each bounding box to a respective visualization by comparing the coordinates of the bounding box to known coordinates of a respective visualization. Accordingly, the autogeneration module 430 determines the visualizations of interest to the user.

In embodiments, the processes of generating heatmaps and bounding boxes and corresponding the bounding boxes to hotspots is repeated as necessary for each heatmap generated per a time duration, e.g., minute. In this way, a timeline (sequence) of interactions with the visualizations is generated over time to establish an order of consumption (interaction) of the visualizations by the user. In one example, during a first viewing session, the user interacts with one visualization within the dashboard more than other visualizations. A relatively larger hotspot is generated in the heatmap to indicate that the visualization is interacted with more compared to other visualizations within the dashboard. In embodiments, the visualizations viewed less have relatively smaller hotspots.

In view of this example, if, in subsequent viewing sessions, that same visualization is looked at more than the other visualizations by the user, the autogeneration module 430 ranks this visualization first because of the common viewing of this visualization. In embodiments, the remaining hotspots are ranked based on whether they were commonly viewed across the various viewing sessions. In one example, visualizations which were commonly viewed across various viewing sessions are ranked higher than viewing sessions which were not commonly viewed.

In embodiments, the timeline is represented as a tree diagram listing the various hotspots across the viewing sessions by the autogeneration module 430. In embodiments, the tree diagram is stored in the database 440 and illustrates any common visualizations looked at during the viewing sessions, in addition to visualizations which were not commonly viewed. In one example, visualizations which are common across the viewing sessions have their hotspots grouped together in a same section of the tree diagram. Alternatively, hotspots which are not commonly viewed are not grouped together in the tree diagram. It is also contemplated herein that the autogeneration module 430 determines a timeline for the visualizations and generates a tree diagram from a single viewing session without further viewing sessions.

In view of the generated tree diagram, the autogeneration module 430 generates a story or exploration of interest to the user. In embodiments, a story is a view which contains a set of scenes displayed in a sequence over time. In embodiments, stories are similar to dashboards because both stories and dashboards use visualizations to illustrate data. However, stories differ from dashboards because stories provide a narrative over a time period. Further, a story can convey a conclusion or recommendation. In embodiments, an exploration is a visual representation of data from the business analytics application which can be explored and investigated to determine how the columns of the datasets from the business analytics application are related. In this way, an exploration differs from a story because a story presents visualizations without their relationships. In embodiments, the autogeneration module 430 automatically generates the story or exploration from the timeline of the tree diagram and displays the story or exploration to the user through the client device 450 and onto the interface 460. The story generated by the autogeneration module 430 contains visualizations of interest to the user indicated by the hotspots of the heatmap and the tree diagram, while the exploration generated by the autogeneration module 430 illustrates the relationships between the datasets of the visualizations of interest.

In one example for automatically generating a story, a sales representative checks a dashboard of a sales business analytics application displayed on their work computer. The sales representative checks the dashboard daily over a time period of a month. In this example, the data shown in the dashboard changes daily because of new information received in the business analytics application which differs from information from the previous day. During the user's daily viewing sessions, the user only looks at the same three visualizations out of many visualizations in the dashboard, e.g., data about the user's store and department sales. Accordingly, the autogeneration module 430 generates heatmaps for each viewing session by placing hotspots on these visualizations.

Continuing with this example, the autogeneration module 430 generates bounding boxes around the hotspots and generates a tree diagram listing the visualizations, including any common visualizations looked at across the various viewing sessions. The autogeneration module 430 automatically generates a story or exploration on command from the tree diagram for the user based on the visualizations listed in the tree diagram, thereby providing the user a story or exploration focused on their interests. In this way, even though the data changes within the dashboard, the systems and processes described herein infer the interests of the user by identifying which visualizations are interacted with and their order of interaction. In embodiments, the story or exploration are presented as slides or other formats. It is also contemplated herein that the generated story presents visualizations which the user did not focus on in previously viewing dashboards. In one example, a visualization is in the story at later slides after presenting slides containing the visualizations of interest.

The autogeneration module 430 continues after the tree diagram generation process in order to generate an exploration or story in view of different data. To generate the story or exploration, the autogeneration module 430 determines which types of data are interacted with by the user by translating the timeline of the tree diagram into a concept tree diagram. In embodiments, each visualization in the dashboard has at least a column of datasets mapped to at least one slot in the visualization. In view of the tree diagram, the autogeneration module 430 already knows which visualizations to analyze because of the tree diagram.

The autogeneration module 430 analyzes the columns of datasets mapped to each visualization identified in the tree diagram to determine what type of data the visualization represents. Specifically, the autogeneration module 430 analyzes the type of data mapped to the visualization to extract ontological concepts which the visualizations represent. In one example, a sales representative looks at the same three visualizations concerning sales. The autogeneration module 430 determines that the first visualization represents the ontological concept of geographic sales, while the second visualization represents the ontological concept of sales policies and the third visualization represents the ontological concept of sales revenue, by analyzing the columns of data mapped to the visualizations.

In embodiments, the columns of data are analyzed in view of predefined data containing examples of specific concepts stored in the database 440. The autogeneration module 430 accesses the predefined data through the network 410 and compares the predefined data to the columns of data mapped to the visualizations. When the autogeneration module 430 finds a match, the module knows which ontological concept the visualization represents.

In embodiments, the ontological concepts determined by the autogeneration module 430 have an inherent relationship with respect to one another. In one example, an ontological concept is sales per week, while another ontological concept is sales per month. The autogeneration module 430 not only determines that these concepts are related in view of sales, but that these concepts represent data for sales over a time period, which is a second relationship between the visualizations. Accordingly, the autogeneration module 430 determines not only the concepts, but also which concepts are related/linked in order to provide a focused story or exploration in view of different data from the data generated previously. In this way, a visualization has columns of a dataset mapped to its slots, and these columns are mapped to a list of ontological concepts, to reduce a visualization to a list of ontological concepts.

In view of the determined ontological concepts, the autogeneration module 430 generates a concept tree diagram. In embodiments, the autogeneration module 430 translates the concept tree diagram to a story or an exploration of columns of similar datasets. In one example, the autogeneration module 430 knows the determined ontological concepts from the concept tree diagram. If the user desires an exploration, the autogeneration module 430 automatically generates an exploration which allows the user to explore sales data based on the categories the user is interested in. The exploration of data provides an additional view of the data presented in the dashboard the user interacts with. Specifically, it is also contemplated herein that a user generates an exploration of data not previously viewed before in the dashboard based on the concept tree diagram generated when the user interacted with previous dashboards. In embodiments, the exploration automatically generated by the autogeneration module 430 is in the format of a chart or other data formats. In this way, the systems and processes described herein provide for an automatically generated story and/or exploration based on the user's interests.

Figure 5:
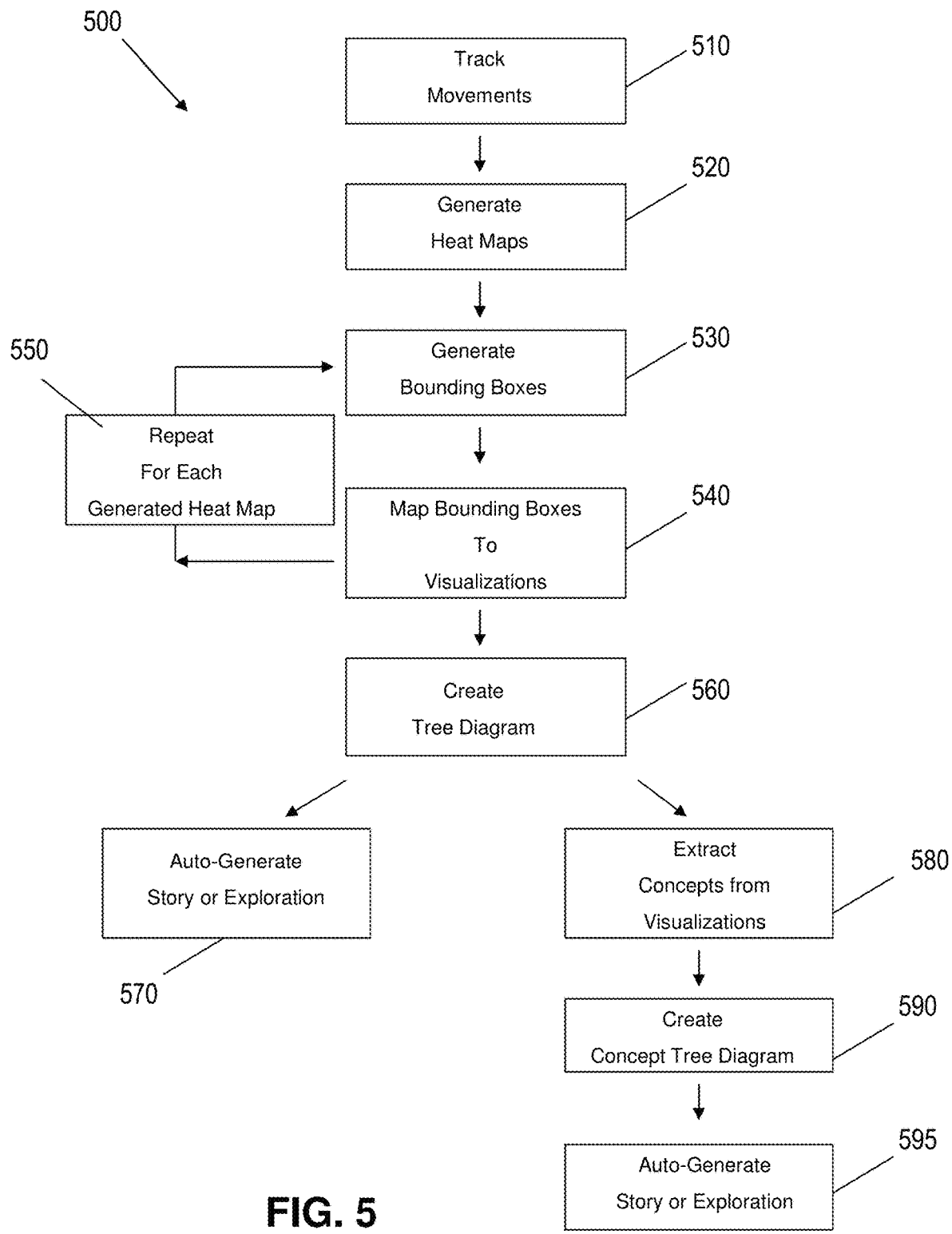
FIG. 5 shows a flowchart of an exemplary method in accordance with aspects of the disclosure.

FIG. 5 shows a flowchart 500 of an exemplary method in accordance with aspects of the present disclosure. Steps of the method may be carried out in the environment of FIG. 4 and are described with reference to elements depicted in FIG. 4.

At step 510, the system tracks a user's eye movements and other gestures, e.g., mouse events and keyboard events, as the user interacts with the dashboard of the business analytics application. The system tracks the user's movements through the tracking device 470. The system generates a heatmap at step 520 over the dashboard to represent visualizations which the user interacted with. In embodiments, and as described with respect to FIG. 4, the autogeneration module 430 generates hotspots over the interacted visualizations to illustrate the visualizations interacted with.

At step 530, the system generates bounding boxes around each hotspot using the autogeneration module 430 to determine which visualizations the user focused on. In embodiments, the autogeneration module 430 generates bounding boxes through edge detection processes around edges of the hotspots. At step 540, the system maps the bounding boxes to the visualizations. Specifically, the autogeneration module 430 compares the list of coordinates of the visualizations to the coordinates of the bounding boxes to determine the locations of the visualizations of interest. At step 550, the processes of generating heatmaps and bounding boxes and mapping the bounding boxes to the visualizations is repeated as necessary for each heatmap generated per a time duration, e.g., minute.

At step 560, the system through the autogeneration module 430 creates a timeline in the form of a tree diagram for the visualizations. The tree diagram illustrates any common visualizations and the order of consumption of the visualizations. At step 570, the system generates a story or exploration using the autogeneration module 430. In embodiments, the autogeneration module 430 automatically generates a story containing visualizations of interest from the timeline of the tree diagram and displays the story to the user through the client device 450 and onto the interface 460.

At step 580, the system extracts concepts from the visualizations through the autogeneration module 430. In embodiments, the autogeneration module 430 analyzes the type of data mapped to the visualization by comparing the data located in slots of the visualization to predefined data to determine ontological concepts which the visualizations represent. At step 590, the system through the autogeneration module 430 generates a concept tree diagram in view of the determined ontological concepts. At step 595, the system through the autogeneration module 430 translates the concept tree diagram to a story or an exploration of columns of similar datasets to automatically generate a story or an exploration.

Figure 6:
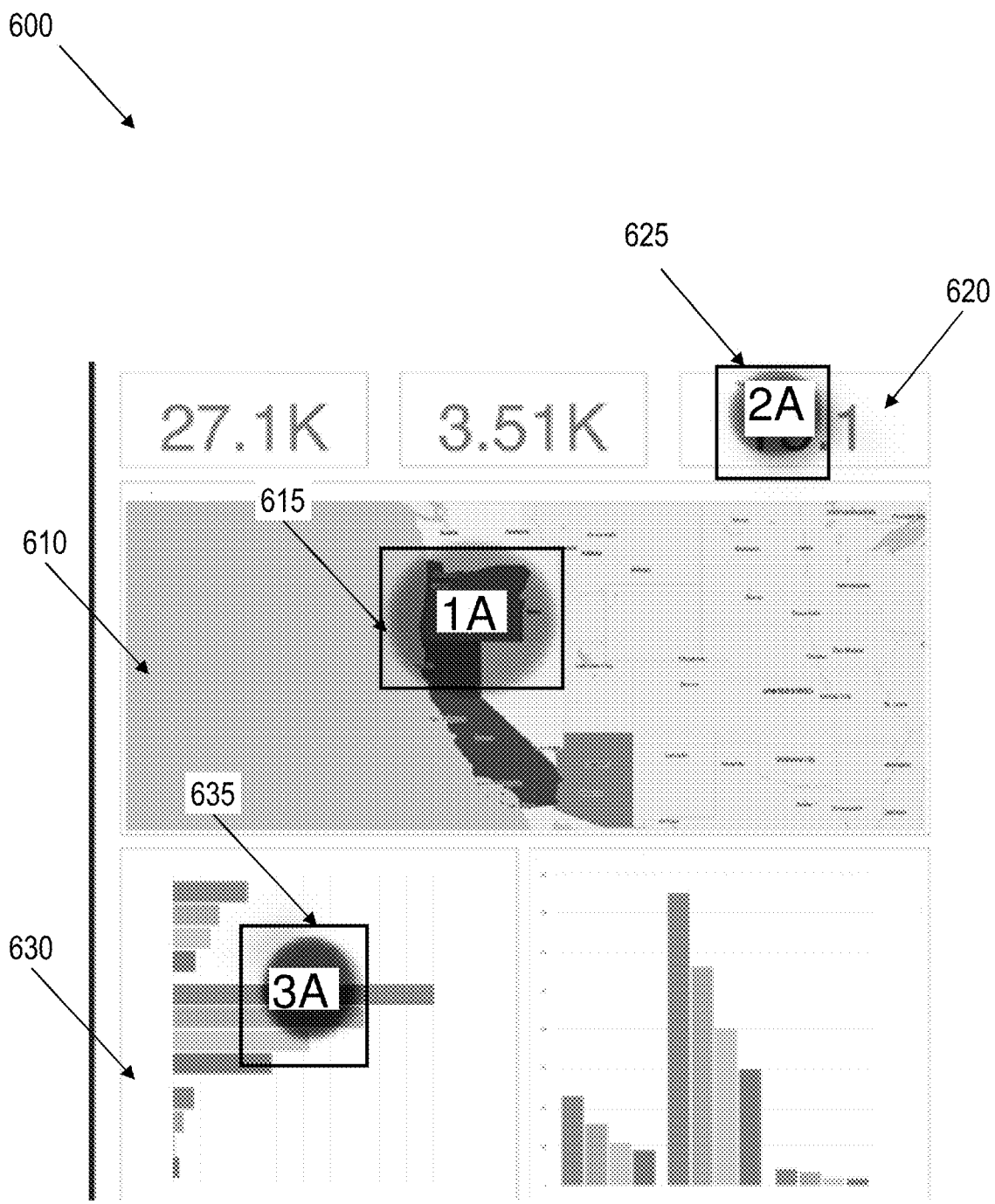
FIGS. 6 and 7 show exemplary heatmaps in accordance with aspects of the disclosure.
Figure 7:
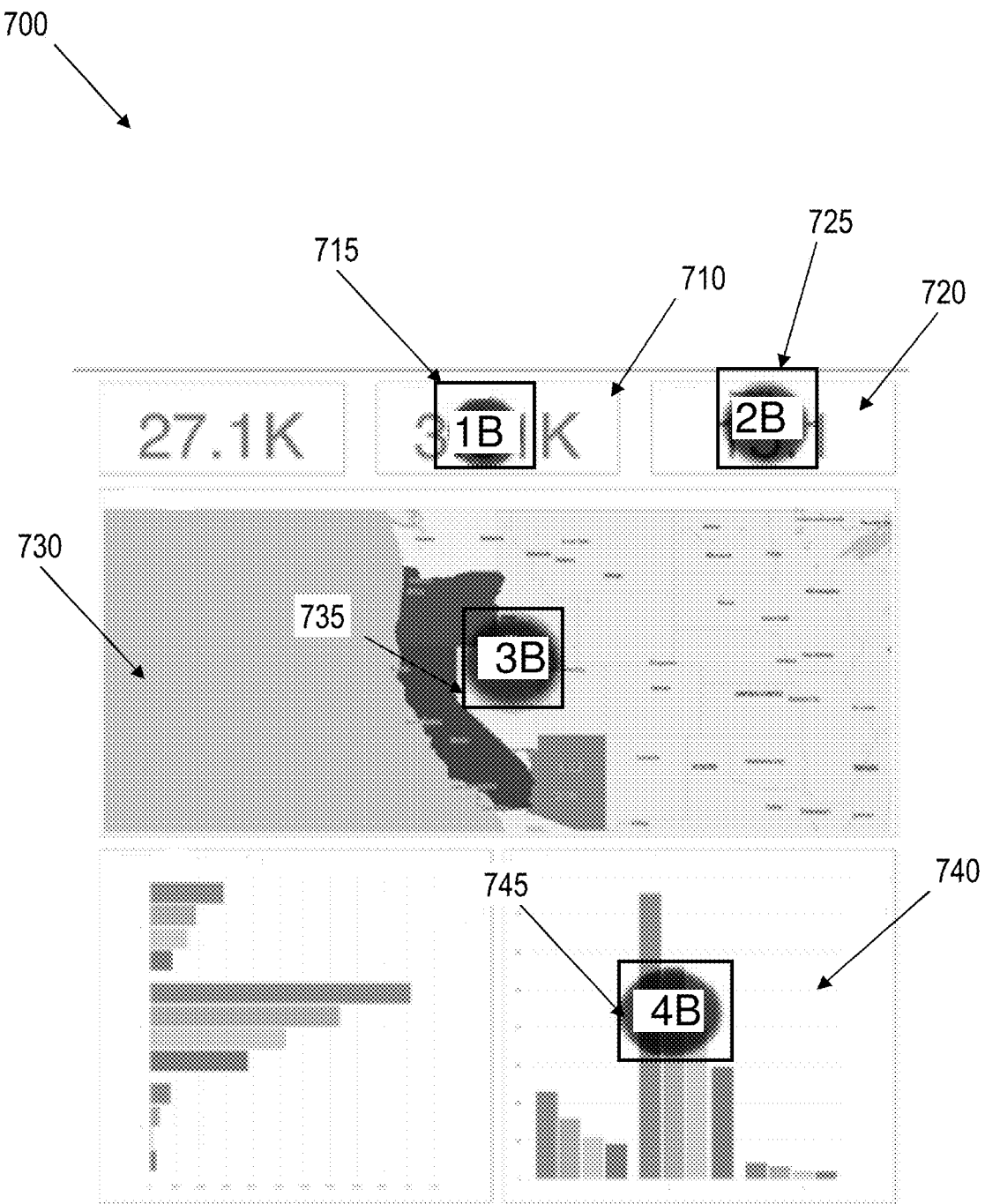

FIGS. 6 and 7 illustrate example heatmaps 600, 700 for different viewing sessions. In embodiments, the heatmap 600 represents the first viewing session and includes hotspots 1A, 2A, 3A for the visualizations 610, 620, 630 in the dashboard. Further, the heatmap 700 represents the second viewing session and includes hotspots 1B, 2B, 3B, 4B for the visualizations 710, 720, 730, 740 in the dashboard. As illustrated in FIG. 6, the hotspots 1A, 2A, 3A are different sized shapes to represent which hotspot was consumed more and/or an order of the hotspots based on the eye tracking of the user.

Bounding boxes 615, 625, 635 are generated around the hotspots 1A, 2A, 3A for the visualizations 610, 620, 630. Further, bounding boxes 715, 725, 735, 745 are generated around the hotspots 1B, 2B, 3B, 4B for the visualizations 710, 720, 730, 740. The bounding boxes 615, 625, 635, 715, 725, 735, 745 are compared to known coordinates of the visualizations to determine which bounding boxes correspond to which visualizations.

Figure 8:
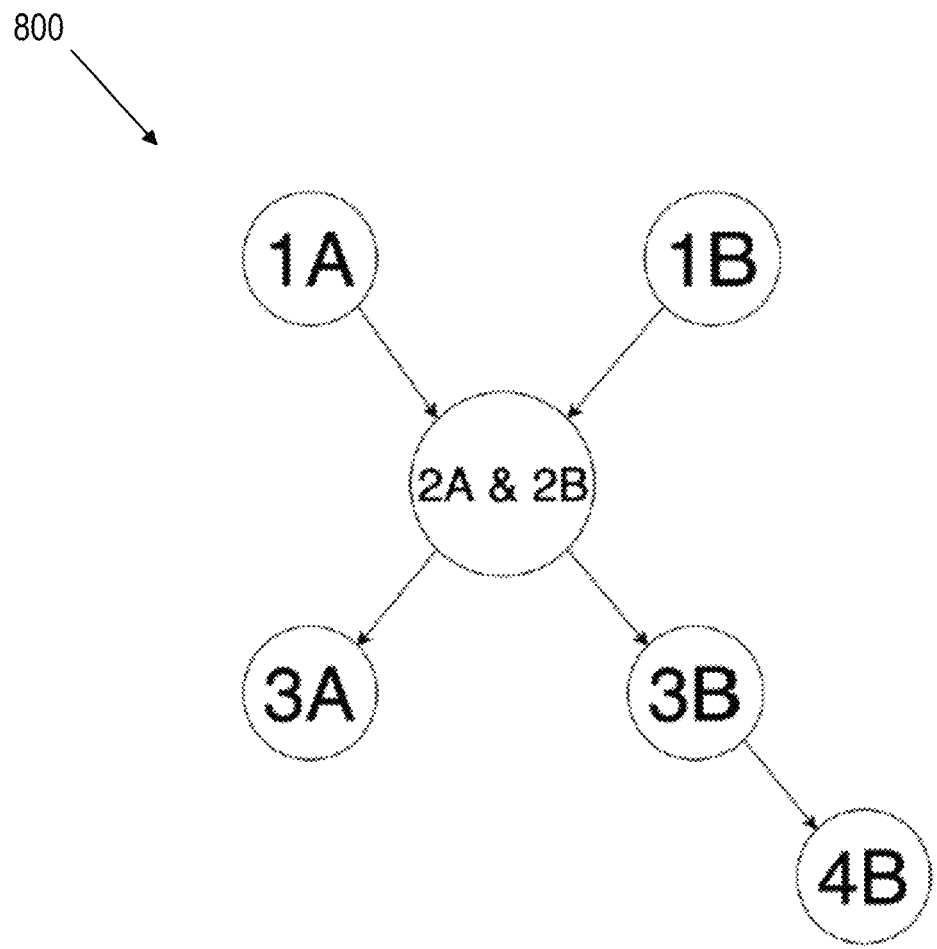
FIG. 8 shows an exemplary tree diagram of viewing sessions in accordance with aspects of the disclosure.

FIG. 8 illustrates an example of a tree diagram 800 in accordance with aspects of the present disclosure. The tree diagram 800 illustrates the hotspots 1A, 2A, 3A of heatmap 600 and the hotspots 1B, 2B, 3B, 4B of the heatmap 700. In embodiments, the tree diagram 800 shows which, if any, visualizations are commonly viewed across the different viewing sessions by grouping hotspots together. In embodiments, the hotspots 1A, 2A, 3A of heatmap 600 and the hotspots 1B, 2B, 3B, 4B of the heatmap 700 illustrate a timeline (sequence) of interest to the user to establish an order of consumption (interaction) of the visualizations by the user. In one example, during a first viewing session associated with heat map 600, FIG. 8 illustrates that the user interacts first with a visualization associated with hotspot 1A and then interacts with a visualization associated with hotspot 2A, as indicated by the arrow extending from hotspot 1A to hotspot 2A illustrated in FIG. 8. Further, the user interacts with a visualization associated with the hotspot 3A after interacting with the visualization associated with the hotspot 2A, as indicated by the arrowing extending from the hotspots 2A and 2B to hotspot 3A. In another example, during a second viewing session associated with heat map 700, FIG. 8 illustrates that the user interacts first with a visualization associated with hotspot 1B, then interacts with a visualization associated with hotspot 2B, followed by interacting with a visualization associated with hotspot 3B, as indicated by the arrow extending from hotspot 1A to hotspot 2A and the arrow extending from the hotspots 2A and 2B to hotspot 3A as illustrated in FIG. 8. In embodiments, aspects of the disclosure group hotspots 2A and 2B together which indicates that the visualizations associated with hotspots 2A and 2B are commonly viewed across the different viewing sessions.

Figure 9:
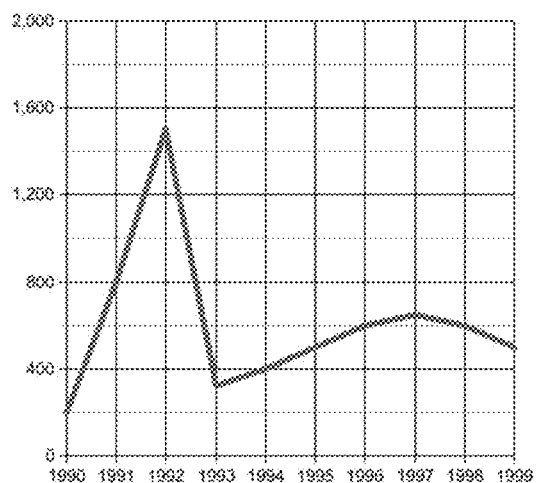
FIG. 9 shows an exemplary automatically generated story in accordance with aspects of the disclosure.
Figure 9:
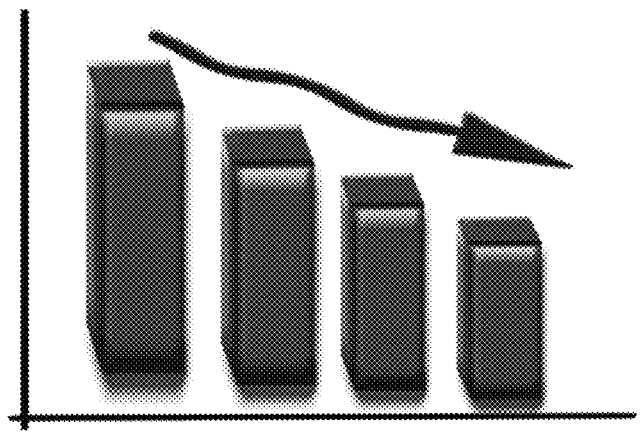

FIG. 9 shows an example of an automatically generated story 900 generated by the systems and processes decried herein. In embodiments, the story 900 includes visualizations of interest of the user determined from previous viewing sessions of a dashboard of a business analytics application, by the systems and processes described above. In embodiments, the user executes a command to automatically generate the story. In one example, the graph illustrates a number of units of product sold over a ten-year period from 1990 through 1999. In another example, a chart illustrates a cost of materials for manufacturing the products over a time period. In this way, aspects of the disclosure automatically generate a story illustrating information interesting to the user, i.e., the sales trend of the products and the costs trend of the products.

Figure 10:
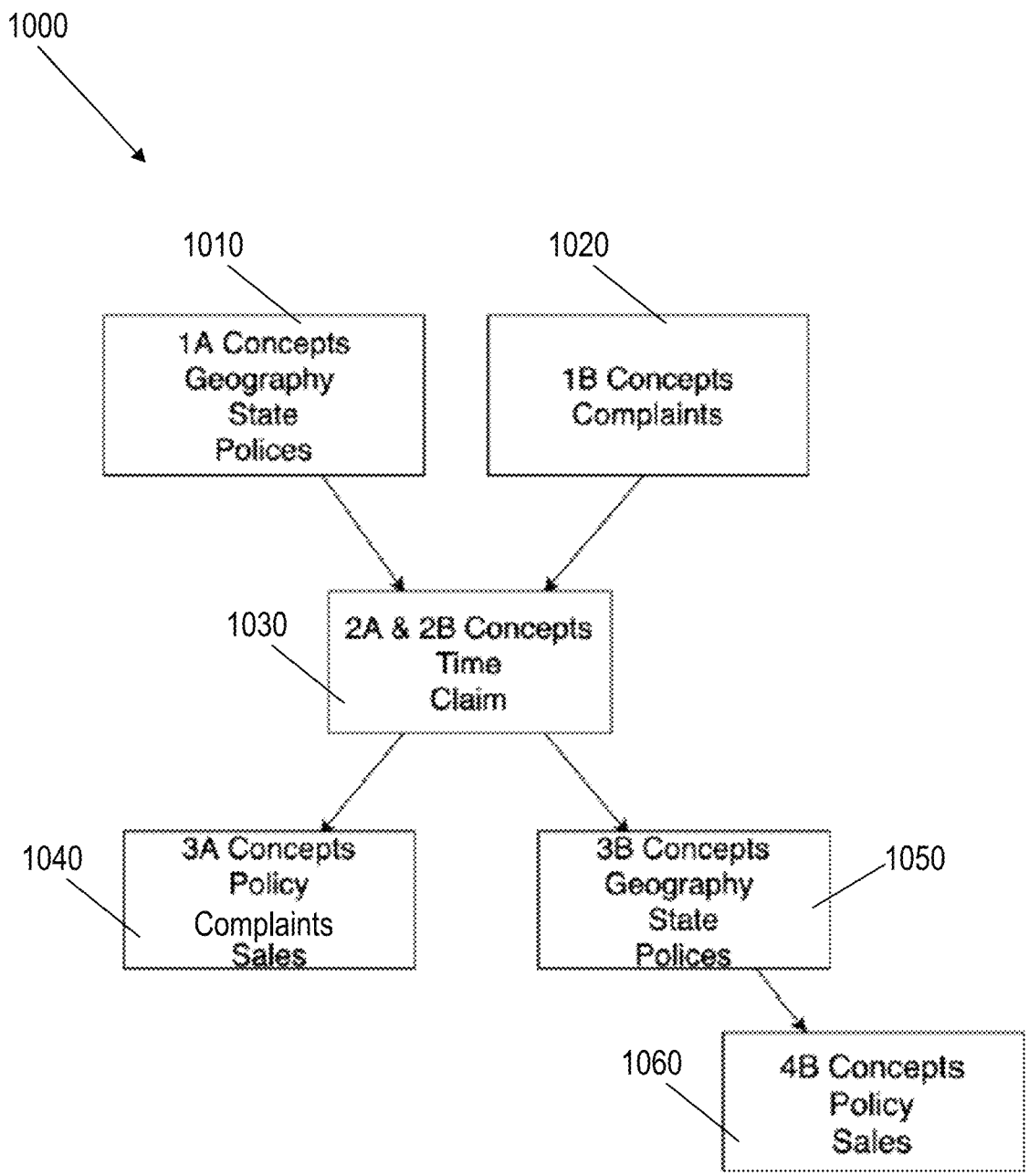
FIG. 10 shows an exemplary concepts tree diagram in accordance with aspects of the disclosure.

FIG. 10 shows an example of a concept tree diagram 1000 in accordance with aspects of the present disclosure. In embodiments, columns of data mapped to slots in each visualization identified in the tree diagram are analyzed to determine what type of data the visualization represents. Specifically, predefined data stored in the database 440 provides examples of specific concepts. As an example, aspects of the disclosure compare predefined data to columns of data mapped to the visualizations 610, 620, 630, 710, 720, 730, 740 of FIGS. 6 and 7 to extract the ontological concepts 1010, 1020, 1030, 1040, 1050, 1060 from the visualizations 610, 620, 630, 710, 720, 730, 740.

In embodiments, the hotspots 1A, 2A, 3A of heatmap 600 and the hotspots 1B, 2B, 3B, 4B of the heatmap 700 illustrate a timeline (sequence) of interest in interacting with the visualizations to the user and the ontological concepts the user interacts with during the viewing sessions. In one example, during a first viewing session associated with heat map 600, FIG. 10 illustrates that the user interacts first with a visualization associated with hotspot 1A, then interacts with a visualization associated with hotspot 2A, and then interacts with a visualization associated with the hotspot 3A, as indicated by the arrow directions. Further, FIG. 10 illustrates the order of interaction by the user with respect to the ontological concepts. In one example, FIG. 10 illustrates the user first interacts with the ontological concept of geography and state policies, then interacts with the ontological concept of time claim, followed by the user interacting with the ontological concept of policy, complaints, and sales, as indicated by the arrow directions in FIG. 10. In this way, FIG. 10 illustrates the order of consumption of the ontological concepts in addition to the order of consumption of the visualizations.

In embodiments, FIG. 10 further illustrates that for the viewing session associated with heatmap 700, the user first interacts with the ontological concept of complaints, then interacts with the ontological concept of time claim, followed by the user interacting with the ontological concept of geography, state, and policies, and policy sales, as indicated by the arrow directions in FIG. 10. In embodiments, aspects of the disclosure group hotspots 2A and 2B together which indicates that the ontological concepts associated with hotspots 2A and 2B are commonly viewed across the different viewing sessions.

Figure 11:
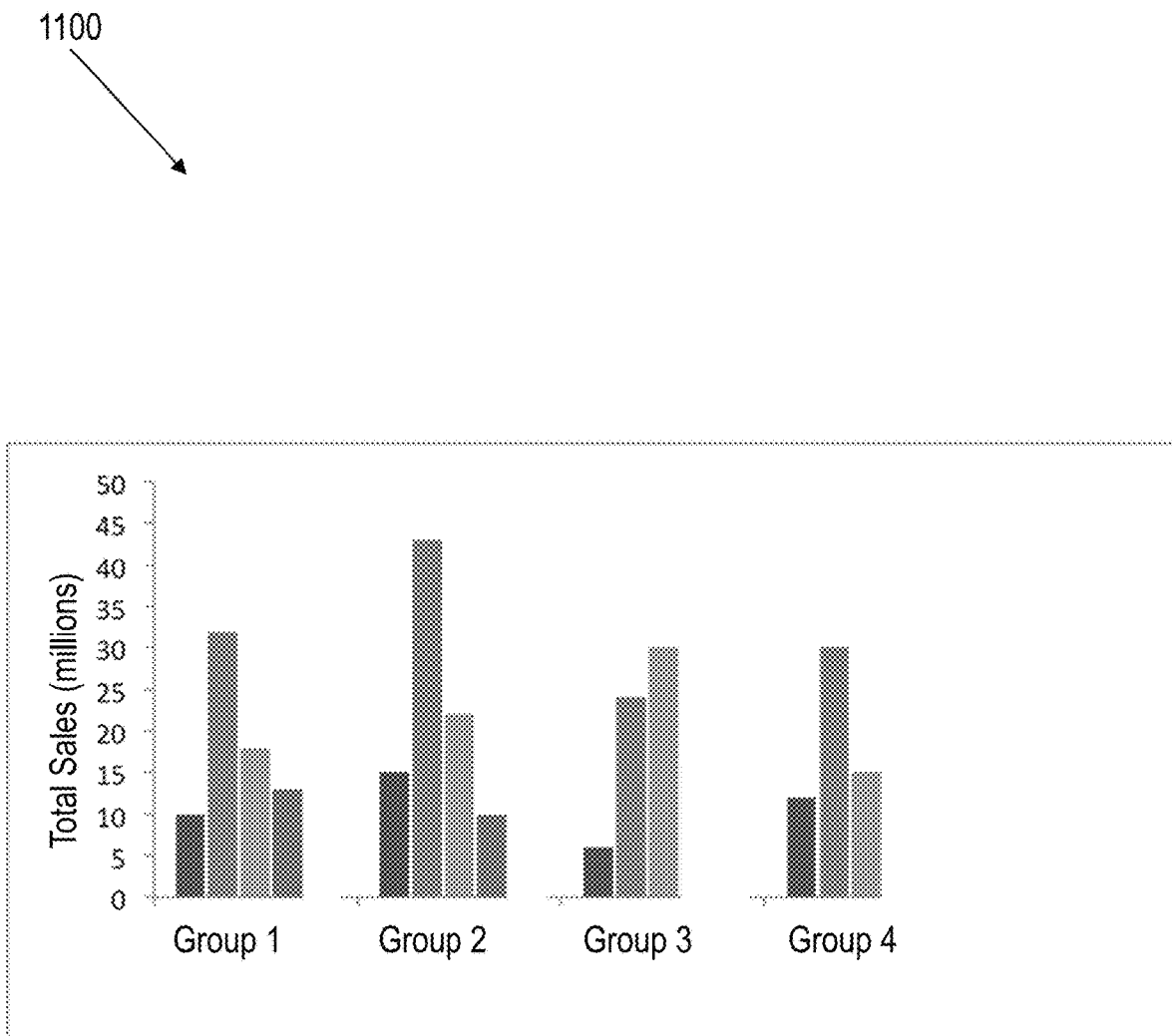
FIG. 11 shows an exemplary automatically generated exploration in accordance with aspects of the disclosure.

FIG. 11 shows an example of an automatically generated exploration 1100 generated by the systems and processes decried herein. In embodiments, the systems and processes described herein translate the concept tree diagram 1000 of FIG. 10 to an exploration 1100 of columns of similar datasets. In this way, the exploration 1100 allows the user to explore data based on the categories of user interest. In one example, Group 1 illustrates the total sales of the product in view of the ontological concepts of FIG. 10. In embodiments, Group 1 illustrates how total sales are affected by the ontological concepts of: a) complaints; b) time claim; c) geography and state policies; and d) policy sales. In another example, Group 3 illustrates how total sales are affected by the ontological concepts of: a) geography and state policies; b) time claim; and c) policy, complaints and sales. In this way, aspects of the disclosure allow the user to explore data previously not presented to the user in the dashboard.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the disclosure provides a computer-implemented method, via a network. In this case, a computer infrastructure, such as computer system/server 12 (FIG. 1), can be provided and one or more systems for performing the processes of the disclosure can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    tracking, by a computer device, movements of a user viewing a dashboard containing visualizations;
    generating, by the computer device, heatmaps having hotspots onto the dashboards in view of the tracked movements of the user, wherein a size of a hotspot of the hotspots is related to an amount of interaction time by the user with respect to a visualization of the visualizations;

generating, by the computer device, bounding boxes around the hotspots;

mapping, by the computer device, the bounding boxes to the visualizations;

creating, by the computing device, a timeline of the visualizations looked at by the user with a tree diagram listing the hotspots which correspond to the bounding boxes, the hotspots being based on a common viewing across a plurality of viewing sessions in a sequence of the visualizations indicating order of consumption of each of the viewing sessions; and generating automatically, by the computing device, a story or an exploration from the tree diagram.

2. The method of claim 1, wherein the mapping the bounding boxes to the visualizations includes comparing a set of coordinates of the visualizations to a set of coordinates of the bounding boxes.

3. The method of claim 1, further comprising ranking, by the computer device, the visualizations in order of a number of views by the user.

4. The method of claim 1, further comprising:
reducing, by the computer device, the visualizations to a list of concepts; and
determine the list of concepts which the visualizations represent by analyzing a type of data mapped to the visualization and comparing the data mapped to the visualization to predefined data.

5. The method of claim 4, further comprising creating, by the computer device, a concept tree diagram from the list of concepts.

6. The method of claim 5, further comprising translating, by the computer device, the list of concepts into columns of datasets.

7. The method of claim 6, further comprising:
ranking the visualization of the visualizations first because of the common viewing of the visualization in subsequent viewing sessions of the dashboard by the user;
feeding the heatmaps into a computer vision model to create a sequence of the visualizations looked at by the user by the computer vision model detecting the hotspots within the heatmap; and
generating a new exploration or a new story in view of the concept tree diagram, wherein:
the story or the exploration includes related datasets from the columns of datasets,
the new exploration or the new story includes data not previously viewed before in the dashboard based on the concept tree diagram generated when the user interacted with previous dashboards, and
the bounding boxes are generated around the hotspots through edge detection processes around edges of the hotspots.

8. The method of claim 4, wherein the visualizations are reduced to the list of concepts by comparing columns of datasets mapped in slots of the visualizations to predefined concept data.

9. The method of claim 1, wherein the tracked movements of the user include eye movements and gestures from the user.

10. The method of claim 1, wherein the hotspots are detected in the heatmaps by the computing device through a computer vision model.

11. The method of claim 1, wherein the tree diagram groups commonly viewed hotspots together.

12. The method of claim 1, wherein the computing device includes software provided as a service in a cloud environment.

13. A computer program product comprising one or more computer readable storage media having program instructions collectively stored on the one or more computer readable storage media, the program instructions executable to:
track movements of a user viewing a dashboard of visualizations;
generate heatmaps onto visualizations in the dashboards from the tracked movements of the user;
analyze the heatmaps to detect hotspots in the heatmaps, wherein a size of a hotspot of the hotspots is related to an amount of interaction time by the user with respect to a visualization of the visualizations;
create boundaries around the hotspots;
map the boundaries to the visualizations;
determine which select visualizations of the visualizations were consumed by the user by comparing coordinates of the mapped boundaries to coordinates of the select visualizations;
generate a tree diagram listing the select visualizations which illustrates an order of consumption of the select visualizations and creates a sequence of the select visualizations looked at by the user, the hotspots based on a common viewing across a plurality of viewing sessions; and
generate automatically a story or exploration from the tree diagram in another format of information that includes user interests.

14. The computer program product of claim 13, further comprising program instructions to reduce the selected visualizations to a list of concepts.

15. The computer program product of claim 14, further comprising program instructions to:
generate a concept tree diagram from the list of concepts; and
capture and analyze information to infer the user interests.

16. The computer program product of claim 14, wherein the story or the exploration includes columns of related datasets from the concept tree diagram, the computer program product further comprising program instructions to:
rank the visualization of the visualizations first because of the common viewing of the visualization in subsequent viewing sessions of the dashboard by the user.

17. A system comprising:
a processor, a computer readable memory, one or more computer readable storage media, and program instructions collectively stored on the one or more computer readable storage media, the program instructions executable to:
track movements of a user viewing a plurality of dashboards;
generate heatmaps onto visualizations in the dashboards from the tracked movements of the user;
analyze the heatmaps to detect hotspots in the heatmaps, wherein a size of a hotspot of the hotspots is related to an amount of interaction time by the user with respect to a visualization of the visualizations;
create boundaries around the hotspots through edge detection processes around edges of the hotspots;
map the boundaries to the visualizations;
determine which select visualizations of the visualizations were consumed by the user by comparing coordinates of the mapped boundaries to coordinates of the select visualizations;

generate a tree diagram listing the hotspots which correspond to the select visualizations and illustrating an order of consumption of the select visualizations, wherein the order of consumption is the interaction and the tree diagram represents a timeline of the select visualizations looked at by the user;

determine ontological concepts represented by the select visualizations;

reduce the select visualizations to a list of the ontological concepts based on columns of data mapped to the visualizations;

generate a concept tree diagram listing the ontological concepts; and generate automatically a story or an exploration of a narrative over a time-bound session of the tracking from the concept tree diagram based on categories of user interest.

18. The system of claim 17, wherein the hotspots are reduced to the list of concepts by comparing data mapped to the visualizations to predefined concept data, the computer program product further comprising program instructions to:

feed the heatmaps into a computer vision model to create a sequence of the visualizations looked at by the user by the computer vision model detecting the hotspots within the heatmap.

19. The system of claim 17, wherein the exploration illustrates related datasets from the concept tree diagram.

20. The system of claim 17, wherein the tracked movements of the user include eye movements, mouse movements and keyboard movements.

\* \* \* \* \*